United States Patent
Kim (10) Patent No.: US 7,420,629 B2
(45) Date of Patent: Sep. 2, 2008

(54) LIQUID CRYSTAL DISPLAY DEVICE HAVING HEAT PROTECTION PLATES

(75) Inventor: Seung Hoon Kim, Daegu-kwangyokshi (KR)

(73) Assignee: LG. Display Co., Ltd., Seoul (KR)

( * ) Notice: Subject to any disclaimer, the term of this patent is extended or adjusted under 35 U.S.C. 154(b) by 0 days.

(21) Appl. No.: 10/721,735

(22) Filed: Nov. 25, 2003

(65) Prior Publication Data

US 2004/0227872 A1 Nov. 18, 2004

(30) Foreign Application Priority Data

Nov. 28, 2002 (KR) .................. 10-2002-0074817

(51) Int. Cl.
*G02F 1/1333* (2006.01)
*G02F 1/1335* (2006.01)

(52) U.S. Cl. .......................... 349/58; 349/64

(58) Field of Classification Search ............. 349/58, 349/61, 62, 64

See application file for complete search history.

(56) References Cited

U.S. PATENT DOCUMENTS 5,262,880 A * 11/1993 Abileah ................ 349/64
5,293,262 A * 3/1994 Adachi et al. ............... 349/149
6,392,724 B2 * 5/2002 An et al. ........................ 349/58
6,693,682 B2 * 2/2004 Fujishiro et al. .............. 349/65
6,867,825 B2 * 3/2005 Kanatsu et al. ............... 349/60

FOREIGN PATENT DOCUMENTS

JP 09-160010 6/1997
JP 2002-006760 1/2002

OTHER PUBLICATIONS

Office Action dated Sep. 29, 2006 for corresponding Korean Patent Application No. 10-2002-0074817.

* cited by examiner

*Primary Examiner*—Michael H Caley
(74) *Attorney, Agent, or Firm*—Brinks Hofer Gilson & Lione (57) ABSTRACT

A liquid crystal display device is disclosed, in which a heat protection plate is formed between the LCD panel and the fluorescent lamps, to transmit the light emitted from the fluorescent lamps, and to reduce the heat generated in the fluorescent lamps being transmitted to the LCD panel, so that the LCD panel is less affected by the heat generated in the fluorescent lamps. The device includes an LCD panel displaying an image by controlling a transmitted light, a plurality of fluorescent lamps formed below the LCD panel at fixed intervals, and a heat protection plate formed between the LCD panel and the fluorescent lamps, to transmit the light emitted from the fluorescent lamps, and to prevent the heat generated in the fluorescent lamps from being transmitted to the LCD panel.

8 Claims, 5 Drawing Sheets

FIG. 6A measurement points

FIG. 6B measurement points

LIQUID CRYSTAL DISPLAY DEVICE HAVING HEAT PROTECTION PLATES

This application claims the benefit of the Korean Patent Application No. P2002-74817 filed on Nov. 28, 2002, which is incorporated herein by reference.

BACKGROUND OF THE INVENTION

1. Field of the Invention

The present invention relates to a liquid crystal display (LCD) device, and more particularly, to an LCD device having a direct-type backlight which is suitable for improving uniformity of luminance.

2. Discussion of the Related Art

Recently, various flat display devices have been developed, for example, a Liquid Crystal Display (LCD) device, a Plasma Display Panel (PDP), an Electro-Luminescent Display (ELD) and a Vacuum Fluorescent Display (VFD). Among the various flat display devices, the LCD device has been most widely used due to advantageous characteristics of thinness, lightness in weight, and low power consumption. In addition to use as a mobile-type LCD device such as a display for a notebook computer, the LCD device has been developed as a display device for use with computers, television receivers, and for similar applications.

The LCD device uses the optical anisotropy and polarization characteristics of liquid crystal. A liquid crystal is comprised of liquid crystal molecules having long and thin structures, whereby the liquid crystal has electric-field-related alignment characteristics. That is, it is possible to control the orientation of the liquid crystal molecules by applying an electric field to the liquid crystal. Accordingly, when controlling the alignment direction of the liquid crystal molecules, the properties of the liquid crystal are changed, whereby light is refracted in the alignment direction of the liquid crystal by the optical anisotropy, resulting in the display of an image or other information.

Generally, the LCD device includes an LCD panel having a liquid crystal layer between two substrates, a driving circuit for driving the LCD panel, and a backlight for providing a light source to illuminate the LCD panel from the side opposite the viewer.

In the LCD panel, a lower substrate having a thin film transistor (TFT) array thereon is bonded at predetermined intervals to an upper substrate having a color filter array thereon, and then the liquid crystal layer is formed between the lower and upper substrates, whereby a image is displayed by controlling a transmitted light according to a voltage applied to each pixel of the TFT array.

The LCD panel does itself not emit light, so that the LCD panel uses an ambient light source, or requires an additional light source. Accordingly, the LCD panel may be classified into a reflective-type LCD panel and a transmitting-type LCD panel according to the type of the light source. That is, the transmitting-type LCD panel uses an additional light source, and the reflective-type LCD panel uses an ambient light source. A transflective-type LCD panel uses both the additional light source and the ambient light source. Herein, the light source for providing uniform light to the transmitting-type or the transreflective-type LCD panel is referred to as a backlight.

As the backlight consumes electrical power, it is desirable to emit the brightest light with a minimum power dissipated in the backlight. The backlight may be classified into a direct-type and an edge type according to a position of a fluorescent lamp. In the direct-type, the fluorescent lamp emits the light to the entire rear side of the LCD panel. Meanwhile, in the edge-type, the fluorescent lamp is located at an edge of the LCD panel, and the light emitted from the fluorescent lamp is directed to the rear side of the LCD panel through a light-guiding plate.

In the direct-type backlight, a plurality of fluorescent lamps may be formed below the LCD panel, or a bent fluorescent lamp may be formed. A predetermined separation between the fluorescent lamps and the LCD panel must be maintained to prevent the silhouette of the fluorescent lamps from being observed on the LCD panel. Also, a light-scattering means is provided to obtain uniform light intensity. Thus, it is hard to obtain a thin LCD device when using the direct-type backlight therein. In the edge-type backlight, a light-guiding plate is used for uniformly scattering the light to an entire surface of the LCD panel, and it has problems in that the luminance is low. Accordingly, the edge-type backlight is used in an LCD device requiring thinness, e.g., a notebook computer, and the direct-type backlight is used in the LCD device requiring large sized screen and high luminance.

Figure 1:
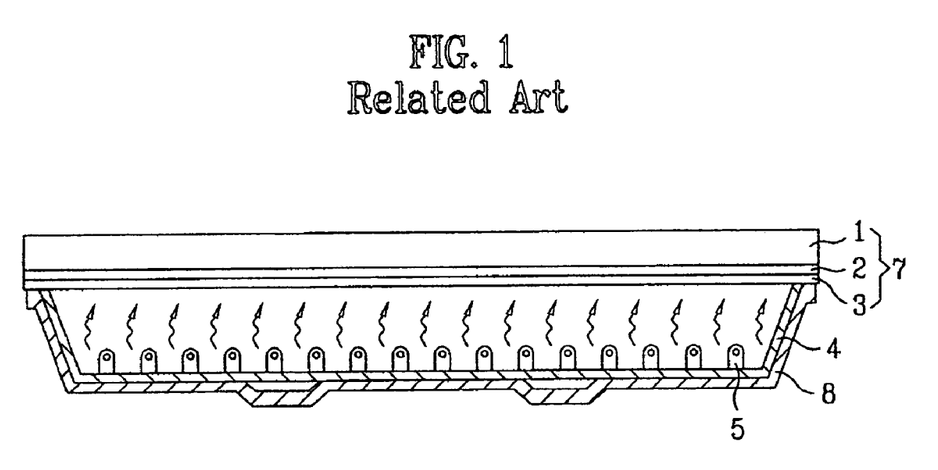
FIG. 1 is a cross-sectional perspective view illustrating an LCD device having a related art direct-type backlight therein.
Figure 2:
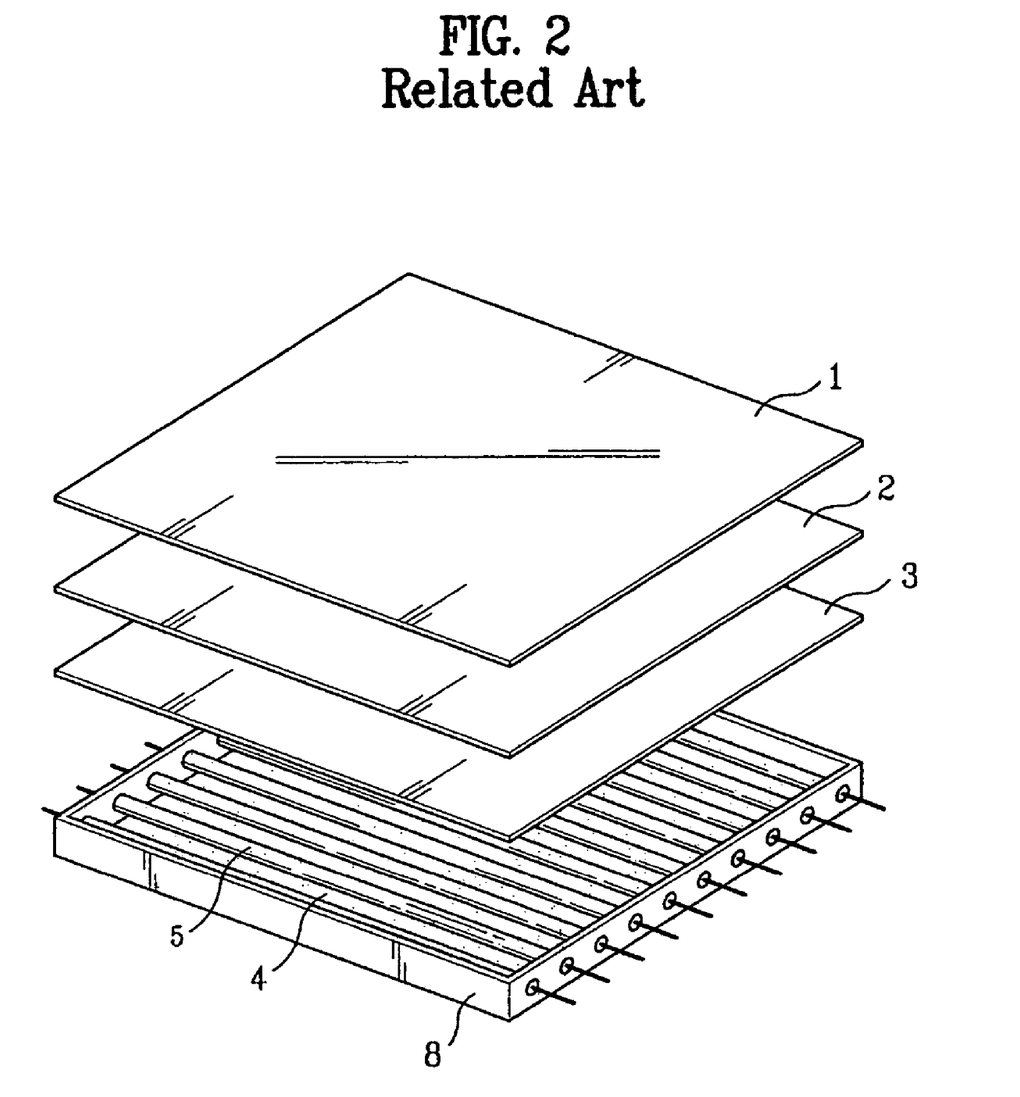
FIG. 2 is an exploded perspective view illustrating a related art direct-type backlight.

Hereinafter, a related art LCD device having a direct-type backlight will be described with reference to the accompanying drawings. FIG. 1 is a cross-sectional perspective view illustrating an LCD device having a related art direct-type backlight, and FIG. 2 is a perspective exploded view illustrating a related art direct-type backlight.

As shown in FIG. 1, the related art LCD device includes an LCD panel 1, a plurality of fluorescent lamps 5, optical sheet 2 and diffusion plate 3, a reflecting plate 4 and a case 8. The LCD panel displays a picture image by controlling a transmitted light, and the plurality of fluorescent lamps 5 are formed below the LCD panel at fixed intervals. Also, the optical sheet 2 and diffusion plate 3 are formed at a rear surface of the LCD panel 1 to prevent the silhouette of the fluorescent lamps 5 from being observed at a display surface of the LCD panel 1, and to provide a light source having uniform luminance. A reflecting plate 4 is formed below the fluorescent lamps 5 to reflect the light emitted from the fluorescent lamps 5 to the LCD panel 1, and the case 8 supports the fluorescent lamps 5 and the reflecting plate 4.

An air layer is formed between the plurality of fluorescent lamps 5 and the optical sheet 2 and diffusion plate 3, and an air layer is not formed between the LCD panel 1 and the optical sheet 2 and diffusion plate 3.

Hereinafter, the direct-type backlight will be described in detail.

As shown in FIG. 2, the direct-type backlight includes the plurality of fluorescent lamps 5 formed at fixed intervals, the case 8 fixing and supporting the fluorescent lamps 5, the optical sheet 2 and diffusion plate 3 formed between the LCD panel 1 and the fluorescent lamps 5, and the reflecting plate 4 formed on an inner side of the case 8 to reflect the light emitted from the fluorescent lamps 5 on a display part of the LCD panel.

The reflecting plate 4 and the case 8 are formed of a material having high heat conductivity such as the aluminum group. Also, the fluorescent lamps 5 are Cold Cathode Fluorescent Lamps (CCFL), in which electrodes are formed at both ends thereof. That is, when a power is applied to the electrodes at both ends of the lamp, the lamp emits the light. Also, the both ends of the fluorescent lamp 5 are inserted into holes formed at a side of the case 8.

In the direct-type backlight of the related art LCD device having the aforementioned structure, the light passage is as follows: when the power is applied to the fluorescent lamp 5, the fluorescent lamp 5 emits light; part of the emitted light is directly incident on the diffusion plate 3 and the optical sheet 2, and some is reflected by the reflecting plate 4, and then is incident on the diffusion plate 3 and the optical sheet 2; the diffusion plate 3 scatters the incident light, so that the light is uniformly incident on the optical sheet 2; the optical sheet 2 concentrates the incident light through the diffusion plate 3, thereby improving luminance. Subsequently, the light is incident on the LCD panel 1, whereby the image is displayed.

If the fluorescent lamps 5 are formed too close to the LCD panel 1, a silhouette of the fluorescent lamp 5 may be observed on the LCD panel. Accordingly, in order to prevent a silhouette of the fluorescent lamp 5 on the LCD panel, it is desirable to maintain a predetermined interval between the fluorescent lamp 5 and the diffusion plate 3, whereby an open area is formed between the fluorescent lamp 5 and the diffusion plate 3.

Also, when the light emitted from the fluorescent lamp 5 is incident on the LCD panel, the fluorescent lamp 5 emits heat in addition to light. Part of the heat emitted from the fluorescent lamp 5 is directly transmitted to the diffusion plate 3 and the optical sheet 2, and the heat transmitted to the diffusion plate 3 and the optical sheet 2 is transmitted to the LCD panel 1. Some of the heat is absorbed by the reflecting plate 4, and is transmitted to the case 8, and then is emitted to the environment external to the LCD device.

The related art direct-type backlight has the following disadvantages.

As a size of the LCD panel increases, the number of the fluorescent lamps 5, which are required in the direct-type backlight increases, whereby the heat generated in the fluorescent lamps 5 increases.

The heat generated by the fluorescent lamps is emitted through the surface of the case, so that the emitted heat is relatively small. Thus, the internal temperature of the backlight increases (to about 80° C.). This shortens the lifetime of the fluorescent lamp, and the heat generated from the backlight has detrimental effects on the LCD panel, thereby causing problems in operating the LCD panel.

In order to control the increase of the internal temperature in the backlight, it is possible to use a cooling fan. But, the unit manufacturing cost of the LCD device increases, and the power consumption increases. Also, the cooling fan generates noise.

SUMMARY OF THE INVENTION

Accordingly, the present invention is directed to a liquid crystal display device that substantially obviates one or more problems due to limitations and disadvantages of the related art.

Embodiments of the present invention provide a liquid crystal display device in which a heat protection plate is formed between the LCD panel and a light source, to transmit the light emitted from the light source, and to reduce the amount of heat generated in the light source being transmitted to the LCD panel, so that the LCD panel is less affected by the heat generated in the light source. The light source may be a fluorescent lamp, or a semiconductor or polymer source.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the drawings, written description and claims hereof.

To achieve these and other advantages and in accordance with the purpose of the invention, as embodied and broadly described herein, a liquid crystal display device includes an LCD panel displaying an image by controlling a transmitted light, a plurality of fluorescent lamps formed below the LCD panel at fixed intervals, and a heat protection plate formed between the LCD panel and the fluorescent lamps, to transmit the light emitted from the fluorescent lamps, and to reduce the heat generated in the fluorescent lamps being transmitted to the LCD panel.

In an other aspect of the invention, a liquid crystal display device is provided that includes an LCD panel displaying an image by controlling a transmitted light, a plurality of fluorescent lamps formed below the LCD panel at fixed intervals, light-scattering means formed between the LCD panel and the fluorescent lamps, to diffuse and concentrate the light emitted from the fluorescent lamps, and to prevent the heat generated in the fluorescent lamps from being transmitted to the LCD panel. A reflecting plate may be formed below the fluorescent lamps, to reflect the light emitted from the fluorescent lamps to the LCD panel, and a case provided for supporting the fluorescent lamps, the light-scattering means and the reflecting plate.

In another aspect of the invention, a liquid crystal display device is provided including an LCD panel displaying an image by controlling a transmitted light, light-scattering means formed at a rear surface of the LCD panel, a plurality of fluorescent lamps formed below the LCD panel at fixed intervals, at least one light-transmitting plate formed between the light-scattering means and the fluorescent lamps, to transmit the light emitted from the fluorescent lamps, and to prevent the heat generated in the fluorescent lamps from being transmitted to the LCD panel. A reflecting plate may be formed below the fluorescent lamps, to reflect the light emitted from the fluorescent lamps to the LCD panel, and a case for supporting the fluorescent lamps, the light-transmitting plate and the reflecting plate.

In another aspect of the invention, a LCD device is provided including an LCD panel for displaying an image, a plurality of fluorescent lamps which may be formed below the LCD panel, a heat protection plate formed between the LCD panel and the fluorescent lamps with an open area provided between the heat protection plate and the LCD panel. The heat protection plate may be a light scattering means such as an optical sheet or a diffusion panel, or a light transmitting panel.

In another aspect of the invention an LCD device is provided including an LCD panel displaying an image, a plurality of fluorescent lamps, a means for scattering light, which may comprise at least one of an optical sheet for concentrating the light and a diffusion plate for scattering the light incident from the light source and transmitting the light to the LCD panel. The light scattering means is located between the LCD panel and the fluorescent lamps. An open area is formed between the light scattering means and the LCD panel. A means for reflecting light emitted by the fluorescent lamps towards the LCD panel may be a reflector comprising a high reflectivity material, such as silver, titanium or a polymer. A case is provided for supporting the fluorescent lamps, the light-scattering means and the light reflecting means, where the case may be made of a high heat conductivity material such as aluminum or an aluminum alloy.

In a further aspect of the invention, a method is disclosed of reducing the heat reaching an LCD panel of an LCD device, including providing a heat protection plate positioned between the LCD panel and the fluorescent lamps, spacing the heat protection plate and the LCD panel such that an open area is provided between them, and further spacing the fluorescent lamps such that additional open area is created between the heat protection panel and the fluorescent lamps.

The heat protection plate may be made from a variety of materials, including those used for the light scattering means or a light transmitting plate. Further, the heat protection plate may be comprised of multiple heat protection panels of the materials mentioned, with one or more of the panels separated from the other panels by an open area.

The light reflecting means may be positioned at the opposite side of the fluorescent lamps, and may be combined with the inside surface of the case.

In a further aspect of the invention, an LCD device is provided including an LCD panel and a light source, which may be a plurality of fluorescent lamps, or a semiconductor or polymer light source, a means for scattering the light which may be at least one of an optical sheet and a diffusion plate positioned between the light source and the LCD panel. An open area is formed between the light scattering means and the LCD panel, and a reflecting means provided for directing the light from the light source to the LCD panel, where the reflecting means, the light source and the light scattering means are supported by a case.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the written description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
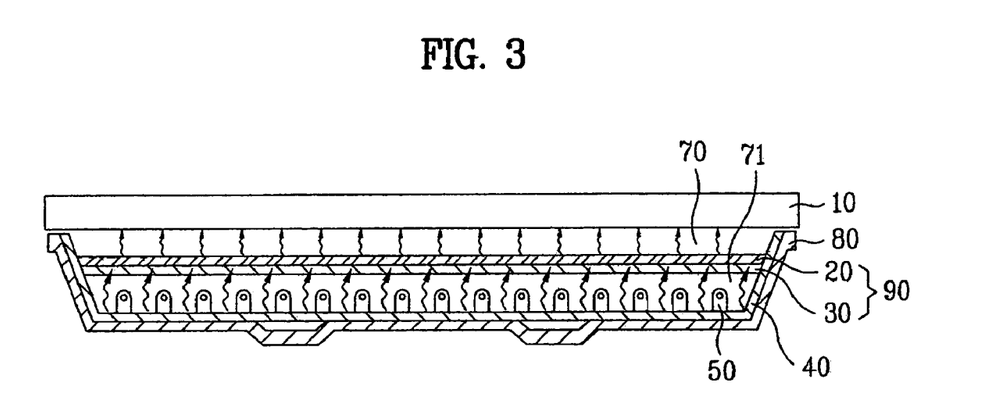
FIG. 3 is a cross-sectional perspective view illustrating an LCD device having a direct-type backlight according to the first embodiment of the present invention.

An LCD device according to the present invention will be described with reference to the accompanying drawings. FIG. 3 is a cross-sectional view illustrating an LCD device having a direct-type backlight according to the first embodiment of the present invention.

An LCD device according to the first embodiment of the present invention uses a diffusion plate and an optical sheet as a heat protection plate, in addition to performing functions of light diffusion and concentration. That is, as shown in FIG. 3, the LCD device includes an LCD panel 10, a plurality of fluorescent lamps 50, light-scattering means 90, a reflecting plate 40 and a case 80. The LCD panel 10 displays an image by controlling a transmitted light, and the plurality of fluorescent lamps 50 are formed below the LCD panel 10 at fixed intervals to emit light. The light-scattering means 90 may be formed between the LCD panel 10 and the plurality of fluorescent lamps 50 to diffuse and concentrate the light emitted from the fluorescent lamps 50, thereby providing light having high uniformity and high luminance to the LCD panel 10. The reflecting plate 40 may be formed below the fluorescent lamps 50 to reflect the light emitted from the fluorescent lamps 50 to the LCD panel 10, and the case 80 supports the fluorescent lamps 50, the light-scattering means 90 and the reflecting plate 40.

Herein, the light-scattering means 90 may include a diffusion plate 30 and an optical sheet 20. The diffusion plate 30 scatters the light emitted from the fluorescent lamps 50 uniformly, to obtain uniform luminance. The optical sheet 20 concentrates the light incident from the diffusion plate 30, and then the concentrated light having high luminance is incident on the LCD panel 10. The reflecting plate 40 may be formed by a method of coating a material having high optical reflectivity, such as silver, titanium or polymer, on a material having high heat conductivity, such as aluminum. The case 80 is formed of a material having high heat conductivity such as aluminum or an aluminum alloy.

In the direct-type backlight according to the first embodiment of the present invention, the silhouette of the fluorescent lamps 50 may be observed on the LCD panel 10. In this respect, an open area 71 is formed between the fluorescent lamps 50 and the LCD panel 10 in order to maintain a predetermined interval therebetween, thereby minimizing or preventing the silhouette of the fluorescent lamps 50 from being observed on the LCD panel 10.

The light-scattering means 90 are formed such that an air layer is formed between the fluorescent lamps 50 and the light-scattering means 90. An air layer 70 is also formed between the light-scattering means 90 and the LCD panel 10, thereby forming a double air-layered structure.

In the direct-type backlight requiring a large sized screen, as the size of the LCD panel 10 increases, the number of the fluorescent lamps 50 increases, and the heat emitted from the fluorescent lamps 50 increases. The heat emitted from the fluorescent lamps 50 is directly transmitted to the light-scattering means 90. The light-scattering means 90 are fixed to the case 80, so that the heat transmitted to the light-scattering means 90 is firstly absorbed in the light-scattering means 90, and then may be emitted to the environment external to the LCD device through the case 80. Accordingly, it is possible to decrease the amount of heat transmitted to the LCD panel 10.

Figure 4:
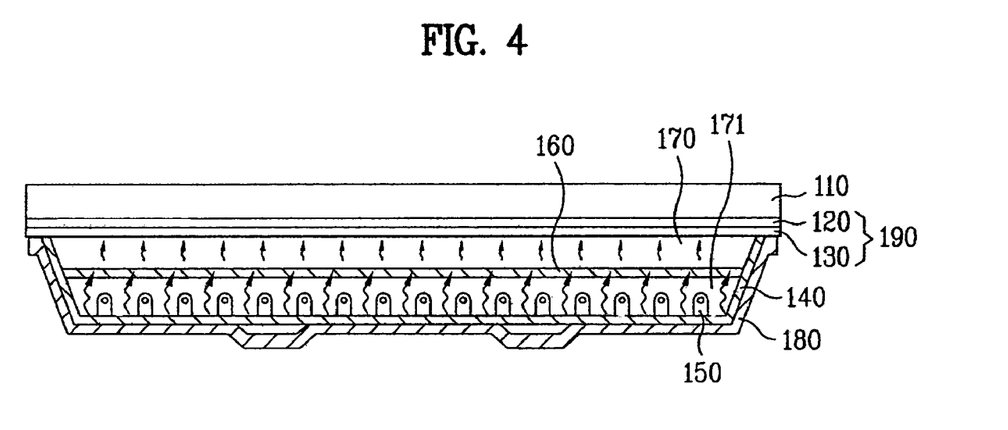
FIG. 4 is a cross-sectional perspective view illustrating an LCD device having a direct-type backlight according to the second embodiment of the present invention.

FIG. 4 is a cross-sectional view illustrating an LCD device having a direct-type backlight according to the second embodiment of the present invention. In the direct-type backlight according to the second embodiment of the present invention, a light-transmitting plate is additionally formed as a heat protection plate between the fluorescent lamps and the light-scattering means.

As shown in FIG. 4, the LCD device according to the second embodiment of the present invention includes an LCD panel 110, a plurality of fluorescent lamps 150, light-scattering means 190, a light-transmitting plate 160, a reflecting plate 140 and a case 180.

At this time, the LCD panel 110 displays an image by controlling a transmitted light, and the plurality of fluorescent lamps 150 may be formed below the LCD panel 110 at fixed intervals to emit light. The light-scattering means 190 may be formed on a rear surface of the LCD panel 110 to diffuse and concentrate the light emitted from the fluorescent lamps 150, thereby providing the light having substantial uniformity and high luminance to the LCD panel 110. A light-transmitting plate 160 is formed between the fluorescent lamps 150 and the light-scattering means 190 to transmit the light emitted from the fluorescent lamps 150 and to reduce the heat emitted from the fluorescent lamps 150 reaching the LCD panel 110. Also, the reflecting plate 140 is formed below the fluorescent lamps 150 to reflect the light emitted from the fluorescent lamps 150 to the LCD panel 110, and the case 180 supports the fluorescent lamps 150, the light-transmitting plate 160 and the reflecting plate 140.

Herein, the light-scattering means 190 may include a diffusion plate 130 and an optical sheet 120. In this case, the diffusion plate 130 scatters the light emitted from the fluorescent lamps 150 uniformly, to obtain uniform luminance. Also, the optical sheet 120 concentrates the light incident by the diffusion plate 130, and then the concentrated light having high luminance is incident on the LCD panel 110.

In order to minimize or prevent the silhouette of the fluorescent lamps 150 from being displayed on the LCD panel 110, an air layer 171 is formed between the fluorescent lamps 150 and the light-transmitting plate 160. Also, an air layer 170 is formed between the light-scattering means 190 and the light-transmitting plate 160, whereby the light-transmitting plate 160 serves as a heat protection plate.

The reflecting plate 140 may be formed by a method of coating a material having high reflectivity, such as silver, titanium or polymer, on a material having high heat conductivity, such as aluminum. The case 180 may be formed of a material having high heat conductivity such as aluminum or an aluminum alloy, and the light-transmitting plate 160 may be formed of the same material as those of the diffusion plate, the light-guiding plate or the optical sheet plate, or a similar material, thereby transmitting the light, while reducing the heat transmission.

Accordingly, when a voltage is applied to the fluorescent lamps 150, the fluorescent lamps 150 emit light. Part of the light emitted from the fluorescent lamps 150 is directly incident on the light-transmitting plate 160, and some is reflected by the reflecting plate 140, and then is incident on the light-transmitting plate 160.

The light-transmitting plate 160 transmits the light, being incident from the reflecting plate 140 and the fluorescent lamps 150, to the light-scattering means 190. The diffusion plate 130 of the light-scattering means 190 scatters the light transmitted by the light-transmitting plate 160, to obtain uniform light. Then, the light is incident on the optical sheet 120, and the optical sheet 120 concentrates the light, and then the concentrated light is incident on the LCD panel 110, thereby displaying the image on the LCD panel 110.

In the backlight of the LCD device according to the second embodiment of the present invention, the heat is transmitted as follows: the fluorescent lamps 150 emit heat, part of which is directly transmitted to the light-transmitting plate 160, and some is absorbed in the reflecting plate 140, and then emitted to the external environment by the case 180. The light-transmitting plate 160 reduces the heat directly transmitted to the LCD panel 110 from the fluorescent lamps 150. Although not shown, the light-transmitting plate 160 may be formed of a plurality of layers.

Figure 5:
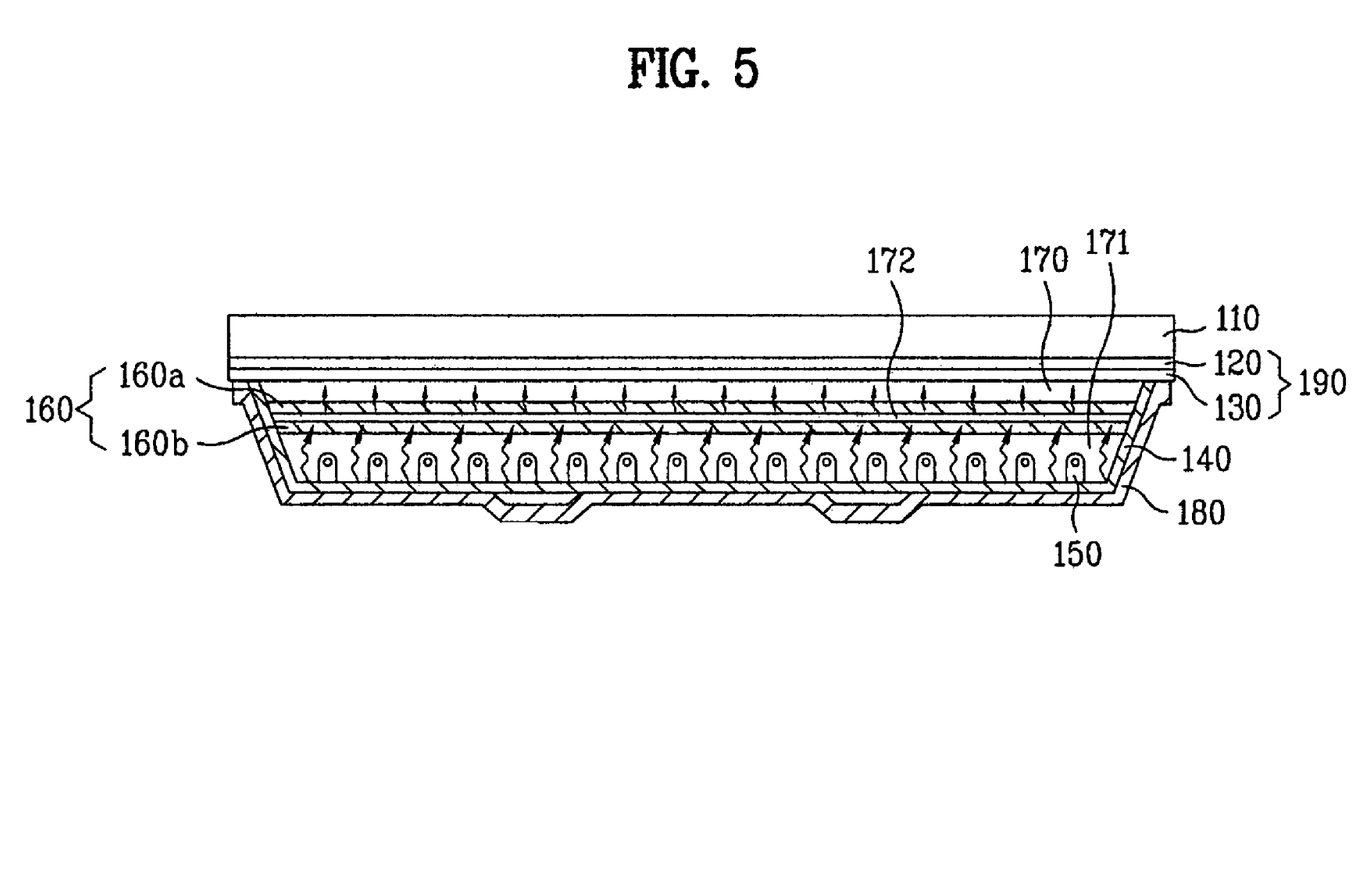
FIG. 5 is a cross-sectional perspective view illustrating an LCD device having a direct-type backlight according to a third embodiment of the present invention.

In a third embodiment of the present invention as shown in FIG. 5. The arrangement is similar to that described in the previous embodiments, however the heat protection layer may also be formed of a plurality of heat protecting panels. Each heat protecting panel may be a light transmitting panel 160, a light-concentrating means such as a optical sheet 120 or a light scattering means such as a diffusion plate 130 or a multilayer combination thereof. Adjacent heat protecting panels may be separated by an open area. As shown in FIG. 5, it is also possible to form more than one light-transmitting plate 160a, 160b, between the fluorescent lamps 150 and the light-scattering means 190, and to form an open area 172 in between a plurality of light-transmitting plates 160, whereby the multi-layered structure is formed to improve the heat reduction efficiency.

Figure 6A:
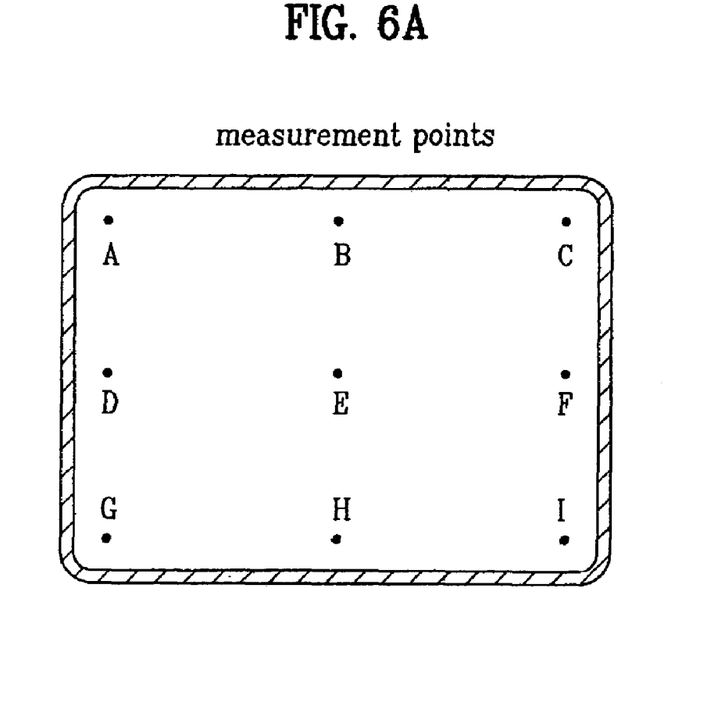
FIG. 6A is a plan view illustrating measurement point locations on an LCD panel.
Figure 6B:
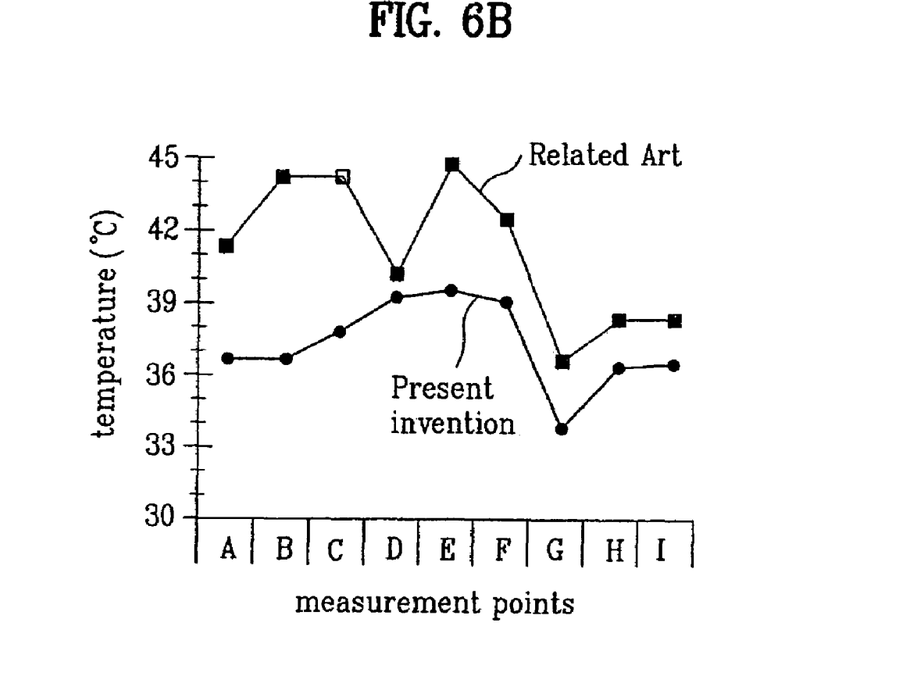
FIG. 6B is a graph illustrating temperatures according to respective measurement point locations in a related art backlight and a backlight according to the present invention.

FIG. 6A is a plan view illustrating the location of measuring points on an LCD panel. FIG. 6B is a graph illustrating measured temperatures at the respective measuring points in a related art backlight and a backlight according to the present invention.

As shown in FIG. 6B, when comparing the backlight according to the present invention with the related art backlight, it shows a maximum temperature difference of 6.3° C. is observed at the measurement point locations, where the measured temperature of the arrangement of the present invention is lower.

The direct-type backlight according to the present invention has the following advantages.

In the direct-type backlight according to the present invention, the heat protection plate is formed between the LCD panel and the fluorescent lamps, thereby decreasing the heat amount transmitted to the LCD panel. Thus, it is possible to overcome the problems such as deterioration of the liquid crystal, material deformations and nonuniformity of luminance.

Also, where the light-scattering means has a diffusion plate and the optical sheet serving as the heat protection plate, it is possible to decrease the amount of the heat transmitted to the LCD panel from the fluorescent lamps without additional components.

Furthermore, at least two heat protection plates may be additionally formed between the fluorescent lamps and the LCD panel, thereby further minimizing the problems generated by the heat.

It will be apparent to those skilled in the art that various modifications and variations can be made in the present invention. Thus, it is intended that the present invention covers the modifications and variations of this invention formed they come within the scope of the appended claims and their equivalents.

What is claimed is:

1. An LCD device having a direct-type backlight comprising:
    an LCD panel for displaying an image;
    a plurality of fluorescent lamps disposed below the LCD panel at fixed intervals in an area substantially corresponding to the LCD panel;
    a first diffusion plate and a first optical sheet attached to the LCD panel such that the first diffusion plate and the first optical sheet are disposed between the LCD panel and the plurality of fluorescent lamps;
    at least two heat protection plates disposed between the first diffusion plate and optical sheet and the plurality of fluorescent lamps;
    a case supporting the plurality of fluorescent lamps and at least two of the heat protection plates, wherein at least two heat protection plates are disposed in the case and contact the case;
    a first open area disposed between at least two heat protection plates and the LCD panel;

a second open area disposed between the at least two heat protection plates; and a third open area disposed between the at least two heat protection plates and the plurality of fluorescent lamps.

2. The LCD device according to claim 1, wherein at least two heat protection plates comprise at least one of a second diffusion plate and a second optical sheet.

3. The LCD device according to claim 1, wherein at least two heat protection plates comprise a light transmitting plate.

4. The LCD device of claim 1, further comprising a reflecting plate disposed to reflect light from the fluorescent lamps to the LCD panel.

5. The LCD device of claim 4, wherein the reflecting plate comprises a high optical reflectivity material containing at least one of silver, titanium and a polymer.

6. The LCD device of claim 4, wherein the reflecting plate is formed on the case.

7. The LCD device of claim 1, wherein the case comprises high heat conductivity material.

8. The LCD device of claim 7, wherein the high heat conductivity material comprises at least one of aluminum and an aluminum alloy.

\* \* \* \* \*